Nov. 13, 1956 L. GONZALEZ 2,770,689
AUTOMATIC INTERRUPTER DEVICE FOR THE ELECTRICAL
CIRCUIT IN AUTOMOBILE VEHICLES IN CASE OF
COLLISION OR OVER-TURNING OF SAME
Filed July 1, 1953 2 Sheets-Sheet 1
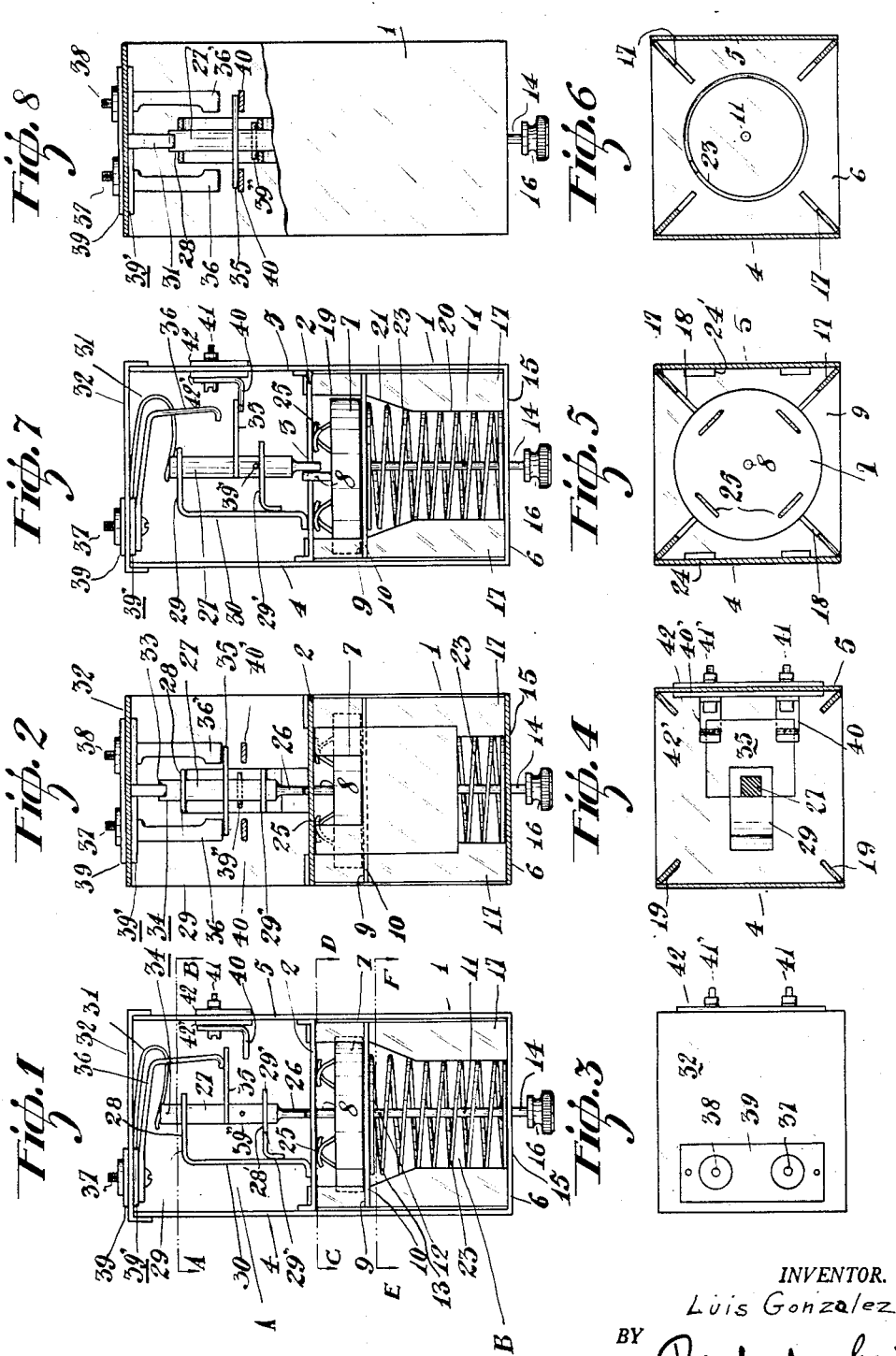
INVENTOR.
Luis Gonzalez
BY
ATTORNEYS

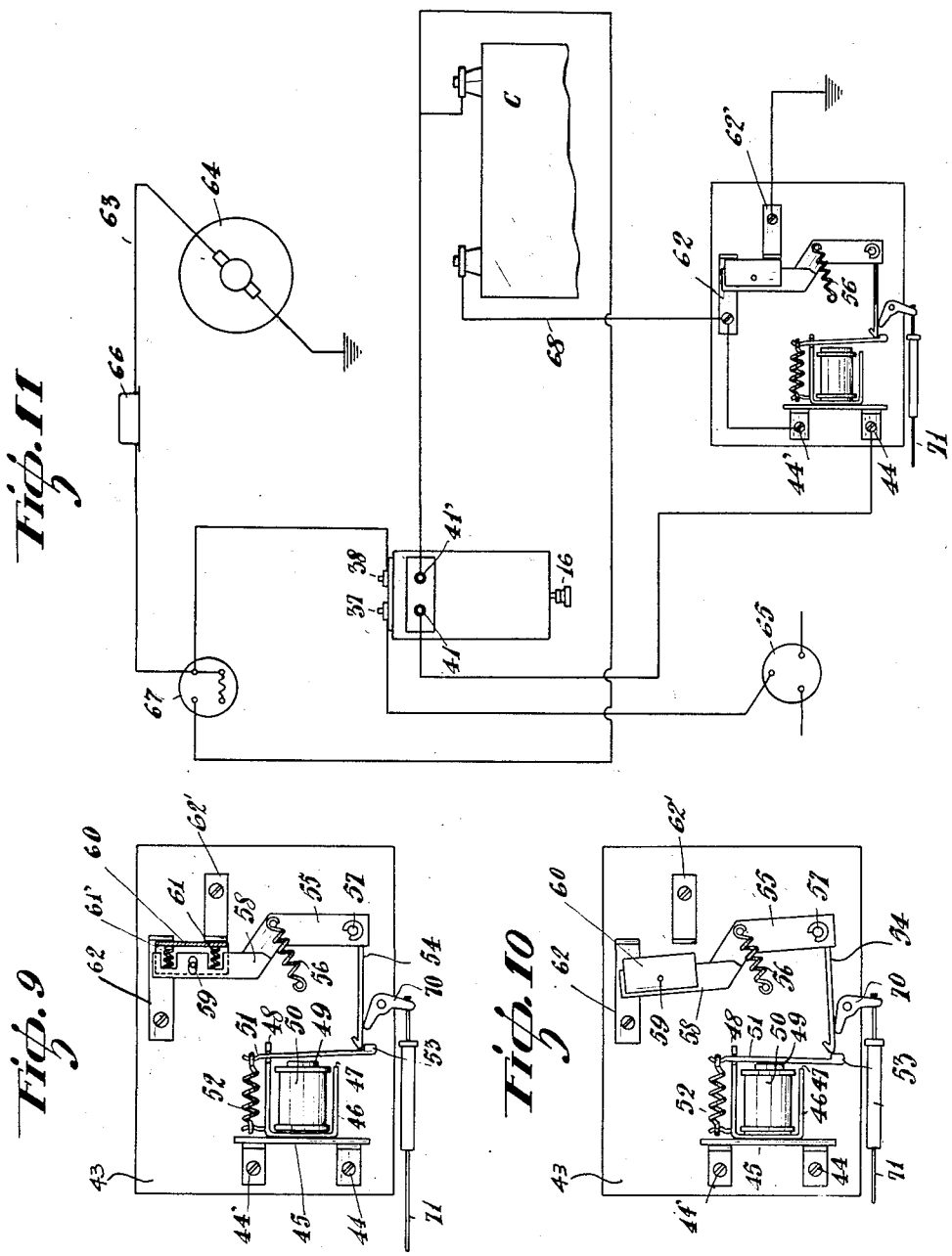

United States Patent Office 2,770,689
Patented Nov. 13, 1956

2,770,689

AUTOMATIC INTERRUPTER DEVICE FOR THE ELECTRICAL CIRCUIT IN AUTOMOBILE VEHICLES IN CASE OF COLLISION OR OVERTURNING OF SAME

Luis Gonzalez, Lomas de Zamora, Argentina

Application July 1, 1953, Serial No. 365,468

6 Claims. (Cl. 200—61.52)

The present invention refers to an automatic interrupter device for the electrical circuit of automobiles in case of collision or over-turning of same, its object being to prevent the setting on fire of the vehicle, which generally takes place due to the above mentioned accidents.

The origin of conflagrations in vehicles involved in accidents is usually due to the sparks given off from the electrical circuit which ignite the vapors given off by the spilled fuel, the fuel leakage being either from the carburetor or the tank, or perhaps some feeding tube which has become damaged in the accident.

The device further contemplates, provision of means for opening the electrical circuits of the automobile during the periods in which same remains parked, thereby eliminating all risk of short circuits which may occur accidentally, and at the same time provides a positive defense against car robbery.

In general terms, the above mentioned device consists of a relatively heavy disk disposed horizontally, with respect to the plane of the vehicle, within a corresponding cover or case, and said disk having a pin mounted on its top face capable of bearing against a vertically sliding piece, of insulating material, with which it is axially lined up; a metallic plate is fixed to this piece which in the normal position of the device, establishes a bridge between two contacts inserted in the circuit "generator-ignition key" of the automobile, and which in case of a collision or over-turning of the latter, abandons said contacts and places the bridge on a second pair of inserted contacts, through an electro-mechanical mechanism, in the interconnecting circuit of battery to frame. It is therefore the horizontal displacement of the above mentioned disk, brought about by its inertia at the impact or percussion of the collision or over-turning, which is the means capable of operating the interrupter device which will cause, as has been explained, the opening of the two circuits related with the electrical energy sources of the said vehicle. The above mentioned disk, in the normal position of the device, is centered in the interior of the cover or case which contains it, and after a collision or over-turning can be restored to its original condition by means of a centering mechanism and guide which is incorporated in the construction of the interrupter. This consideration also stands for the complementary electro-mechanical device, which circumstances make it possible for the user or owner to utilize the interrupter as a defense against robbery of the automobile during the periods in which it is left parking.

In order that the present invention be clearly understood and easily put into practice, it has been represented in its preferable form or manner of execution in the drawings that accompany this specification, and in which:

Figure 1 represents a lateral or side view of the interrupter device in the normal position.

Figure 2 shows a half section view of the same interrupter as seen from the front.

Figure 3 represents a top view, while Figures 4, 5 and 6 show sectional views in accordance with lines A—B, C—D and E—F of Figure 1.

Figure 7 shows a side view of the device in an operated position, and Figure 8 shows a similar view from the other side.

Figure 9 represents a top view of the relay in its normal position, and Figure 10 in its operated position.

And lastly, Figure 11 shows a simplified diagram of the electrical circuit of an automobile in which the interrupter device, object of the present invention, has been inserted.

In all the above mentioned figures, the same reference numbers and letters indicate equal or equivalent parts.

Regarding same, the cover or case for supporting the device, has been designated with the number 1. This supporting case is of an approximately square section and made preferably of iron or brass sheet, it being divided transversely by means of a partition 2 which has a centralized perforation 3 and is fixed to the sides 4 and 5 of the said covering structure, in two zones: a top one A, and a bottom one B. The latter, which is confined by the sides 4 and 5 on the case, the lower face of the dividing partition 2, and the bottom 6, contains in its top part, a disk 7, relatively heavy, provided centrally with a pin 8 facing or oriented towards the perforation of the dividing partition 2, and said disk rests freely on the top face 9 of a movable plate 10, whose shape is approximately the same as the section of the case 1, and said plate slides vertically in the interior of the bottom zone B due to a stem 11, one of whose ends 12 is threaded to a piece 13 rigidly attached to the mid point of the under face of the above mentioned plate, whereas the opposite end 14 is projected outside the casing 1, through a perforation 15 made in the center of the bottom 6, and which terminates in a knob 16 for manual working. The above mentioned sliding plate 10 is guided within the zone B of the casing 1, by means of the fixed guiding flanges 17, perpendicularly attached to the dividing partition 2 and with its internal borders facing, the virtual diagonal planes of this zone of the casing, the lower end of these flanges resting against the bottom 6 of the casing. The said plate 10 has several slits at its corners, of equal extension and oriented along the virtual diagonals of said plate, the guiding flanges 17 running in these cuts, the internal border of each one presents two straight zones 19 and 20 joined by an intermediate oblique zone 21, the under portion of these flanges having their width equal to the extension or length of the cuts 18 made from the respective angles of the sliding plate 10.

Freely disposed in the space bounded by the internal borders of the guiding flanges 17, is placed a helicoidal spring 23, which surrounds the part of the stem 11 within the interior of the zone B of the casing 1, the function of said spring being to normally maintain the sliding plate 10 against the dividing partition 2. The ends of this spiral spring 23 rest, naturally, against the under face of the above mentioned plate 10 and the upper face of the bottom 6 of the casing 1. The motion of plate 10 along the oblique intermediate zone 21 of the flanges 17, is limited by two pieces 24 and 24', of a U shape, rigidly and perpendicularly fixed to said plate at its borders adjacent sides 4 and 5 of the casing 1, in such a manner that the top double end of these pieces 24 and 24' butts against the under face of the dividing partition 2 when the sliding plate 10 reaches the upward top limit of its course, while the bottom and simple ends of these pieces rest against the upper face of the bottom 6 of the casing, fixing the limit of the descent of said plate, whose vertical travel is therefore equal to the distance existing between the two straight zones of the flanges 17. The disk 7, which rests freely on the upper face 9 of the plate 10, is provided on its face towards the partition 2 with flat springs 25 whose free ends rest elastically against the said partition, causing the disk 7 to accompany said sliding plate 10 in its descent.

It is therefore evident that, as the interrupter device is fixed to the body or structure of the automobile, any shock due to a collision or over-turning of the latter, will horizontally displace disk 7 from its normal position centrally, where it can be again placed by pulling the knob 16 which actuates stem 11. This manipulation will bring about the descent of the sliding plate 10, overcoming the tension of the spiral spring 23, and disk 7 will be again centered by the guiding flanges 17, since the internal borders of the straight section 20 of the latter limit a space approximately equal to the diameter of the said disk 7. On ceasing the traction on the above mentioned knob, the sliding plate 10 will ascend, due to the pressure of the spiral spring 23, and with it, the disk 7 with its pin 8 duly centered and lined up with the perforation 3 in the partition 2.

The said pin 8, in the normal position of the device, rests its free end against the lower end 26 of piece 27 of insulating material, disposed vertically in the zone A of the casing 1 lined up axially with the above mentioned pin. This piece 27 whose cross-section is approximately square in the example illustrated, slides vertically through the various perforations 28 and 28' made in the elbowed part 29 and 29' of a supporting member 30, secured to the upper face 9 of the dividing partition 2, said sliding piece 27 being opposed by a flat spring 31, one of whose ends is anchored to the lower part of the cover 32 of the casing 1, while its opposite free end rests elastically in a notch 33 made in the upper end 34 of the piece 27 of insulating material. Towards its mid part, this piece 27 has a metallic sheet 35 attached to it, which moves with piece 27 in its vertical movement. It is this sheet or plate 35 which, in the normal position of the interrupter device, remains in constant contact against the free ends of the pair of contacts 36 and 36', establishing a connecting bridge between them. These contacts are anchored by their opposite ends to the cover 32 of the casing 1 by means of screws with nuts 37 and 38, duly insulated from same by fibre plates 39 and 39'. The outside free ends of the said screws 37 and 38, serve as the corresponding terminals for establishing the electrical connections of said contacts, and as was mentioned before, are inserted in the circuit which interconnects the generator with the ignition key of the automobile (see Figure 11).

Now then: having displaced the disk 7 from its normal centralized position in the casing 1, due to a collision or over-turning of the vehicle, the free end of the stem 8, which by reason of the spiral spring 23 is maintained in contact and axially lined up with the lower end 26 of piece 27, will trip from the latter, which impelled by its flat spring 31, will descend vertically and its metallic sheet 35 will abandon contacts 36 and 36', interrupting the electrical path of the circuit "generator-ignition key" of the automobile, at the same time that in its descending course limit, determined by stop 39" fixed to said piece 27, it will establish a bridging connection between the free ends of another pair of contacts 40 and 40', fixed by means of screws with nuts 41 and 41' to the side 5 of the casing 1 and insulated from it by means of fibre plates 42 and 42'. Here again, as stated before, the outside free ends of the said screws 41 and 41', serve as the connecting terminals inserted in the circuit to the frame of the chassis from the battery C of the vehicle (see Figure 11) through a complementary accessory, which will be described later, and with which the interrupter device works in combination.

This complementary electro-mechanical accessory, illustrated in Figures 9, 10 and 11, consists of an insulating base 43, on which are mounted the terminals 44 and 44' which serve at the same time, as a support for an insulating plate 45, to which is fixed the mounting 46 between whose arms 47 and 48 the core 49 is placed with the coil 50, constituting elements of a relay unit. On the arm 47 of the said mounting, the armature 51 of the relay unit articulates, opposed by the spring 52, and on the free end of which is rigidly fixed the pawl 53 which serves the purpose of locking the arm 54 fixed to a lever 55, opposed by a spring 56. This lever 55 is articulated on a pin 57, fixed to the insulating base 43, and is provided towards its free end with a piece 58, also of insulating material, on which is mounted in an articulated manner, by means of a pivot 59, a contact 60 of U section, opposed by two springs 61 and 61' (see Figure 9), which tends to maintain the contact 60 of the insulating piece 58 separated, since in this latter the perforation for the passage of the above mentioned pivot 59 is slightly elongated; this elastic mounting gives contact 60 a certain flexibility or freedom of movement, since the function of said contact is that of establishing a bridge between the terminals 62 and 62', mounted on the base 43, and inserted in the circuit to ground or frame of the chassis of the automobile, in order to maintain the continuity of this circuit with regard to the electrical path.

*Operation:* In Figure 11 the insertion of the interrupter device has been schematically represented with its electro-mechanical accessory in an ordinary electrical circuit of an automobile. In this illustration it can be noted that cable 63 which interconnects the generator 64 with the ignition key 65 through the breaker 66 and the ammeter 67, is cut and the corresponding ends are connected to the terminals 37 and 38, while terminal 41' is electrically joined to one of the poles or terminals of the battery C, and terminal 41 to terminal 44 of the relay. The ground or frame cable 68 of the battery C, is connected to the terminal 62 of the insulating base 43, while terminal 62' is connected to the chassis of the vehicle. Lastly, a rigid or flexible conductor, interconnects terminals 62 and 44' of the above mentioned relay.

During the normal running of the vehicle, the two constitutive parts of the interrupter device are situated in the manner illustrated in Figures 1–2 and 9–11, respectively. When the collision or over-turning of the vehicle is produced, disk 7 due to its inertia, will be displaced horizontally abandoning its centered position and will cause, as has been previously explained, the opening of the circuit "generator-ignition key" of the automobile, and at the same time, the bridge established between the contacts 41 and 41' by the metallic plate 35, will cause the energizing of the winding of the relay coil which will operate attracting its armature 51 and liberating, therefore, arm 54 of the lever 55, which, solicited by the spring 56, will separate contact 60 from the terminals 62 and 62', thereby interrupting the continuity of the electrical circuit to earth of the battery C and so completing the opening of all the electrical circuits of both sources of power, generator and battery, for feeding electrical energy to the automobile.

In order to start up the car again after an accident, disk 7 must be restored to its normal position in accordance with the manipulation previously explained, and with regard to the normalization of the complementary electro-mechanical accessory, this has been provided with a cam 70 (see Figures 9, 10 and 11), articulated on the insulating base 43, and which can be manually actuated by means of a flexible cable 71, in order to again lock the arm 54 and the pawl 53 of the armature 51 of the before mentioned relay.

From the preceding description and the attached graphical complement, the positive advantages of the automatic interrupter device can easily be seen, stating that in the realization example illustrated, of the device object of the present invention, it is in no way limitative, inasmuch as the said invention can undoubtedly admit construction modifications and of details within the scope to which it corresponds without departing from the limits and scope of the following claims.

Having described the present invention and the manner in which same can be put into practice, the following claims are declared to be of the sole right and property of the inventor:

1. An automatic interrupter device for the electrical circuit in automobile vehicles in case of collision or overturning of same, characterized by the fact that it comprises a relatively heavy disk, horizontally displaceable and freely disposed in the interior of a casing rigidly fixed to the structure or body of the vehicle; said disk carries centrally mounted on its upper face, a pin disposed resting and axially lined up, against a piece of insulating material, opposed by a spring and capable of sliding vertically with regards to the above mentioned disk; said sliding piece being provided with means capable of alternatively establishing a bridging connection between two pairs of contacts, disposed in the interior of the said casing, the first one of them being adapted to be directly inserted in the circuit "generator-ignition key" of the automobile; the second pair of said contacts being adapted to be electrically coupled, through a relay, to the circuit battery-ground of the said automobile; the above mentioned disk resting on a vertically sliding plate, opposed by a spring capable of maintaining the pin of said disk pressed against the piece of insulating material and establishing the bridge on the first pair of contacts; means to correctly guide the vertical sliding of the said disk, and means for manually operating the above mentioned resting plate of the disk.

2. An automatic interrupter device for the electrical circuit in automobile vehicles in case of collision or overturning of same, in accordance with claim 1, characterized by the fact that the pairs of contacts corresponding to the circuits "generator-ignition key" and "battery-ground" of the automobile, are disposed in different planes and within the radius of action of a connecting plate secured to the piece made of insulating material and constitutive of the means capable of establishing alternatively a connecting bridge between one or the other of the said pair of contacts.

3. An automatic interrupter device for the electrical circuit in automobile vehicles in case of collision or overturning of same, in accordance with claim 2, characterized by the fact that the piece made of insulating material is guided for its vertical sliding, within various perforations made in a double elbow provided in a support and secured to the casing of the device; said insulating piece has a stop mounted on it capable of limiting its maximum descending vertical travel and of presenting the connecting plate to the second pair of contacts placed within the radius of action of same.

4. An automatic interrupter device for the electrical circuit in automobile vehicles in case of collision or overturning of same, in accordance with claim 2, characterized by the fact that on the upper part of the piece made of insulating material, a spring rests and is anchored to the cover of the casing, constitutive of the means for giving the required pressure to the said sliding piece against the pin provided in the upper face of the horizontally displaceable disk.

5. An automatic interrupter device for the electrical circuit in automobile vehicles in case of collision or overturning of same, in accordance with claim 1, characterized by the fact that the means for guiding the vertical sliding of the horizontally displaceable disk, are constituted by a plurality of vertical flanges, radially disposed in the interior of the casing of the device, and capable of being inserted in an equal number of cuts, of the same length, made radially from the outside border of the sliding plate on which the said disk rests; the internal borders of these flanges being progressively and equally oblique towards their bases and having a lower terminal zone of practically the same diameter as the diameter of the disk when the plate descends, centering it with relation to the said plate and disposing the pin of the above mentioned disk in line with the piece made of insulating material.

6. An automatic interrupter device for the electrical circuit in automobile vehicles in case of collision or overturning of same, in accordance with claim 1, characterized by the fact that the means for manually operating the sustaining sliding plate of the disk, consist of a stem rigidly and centrally secured to the lower face of said plate; the mentioned stem being projected outside the casing of the device and terminated in a knob for the manual operation; pulling on said knob causes the descent of the sliding plate along the whole length of the guiding flanges, overcoming the tension of a spiral spring inserted between said plate and the base of the casing of the device; said descent of the sliding plate being capable of centering the disk with relation to the plate and lining up the pin of the disk with the piece made of insulating material.

References Cited in the file of this patent

UNITED STATES PATENTS

| | | |
|---|---|---|
| 1,901,554 | De Wilde | Mar. 14, 1933 |
| 2,240,085 | Wells | Apr. 29, 1941 |
| 2,291,236 | Kilgour | July 28, 1942 |
| 2,581,338 | La Roza | Jan. 8, 1952 |

FOREIGN PATENTS

| | | |
|---|---|---|
| 382,229 | Great Britain | Oct. 20, 1932 |
| 590,144 | Great Britain | July 9, 1947 |
| 721,772 | France | Dec. 23, 1931 |
| 734,940 | France | Aug. 13, 1932 |